(12) United States Patent
Filsfils et al.

(10) Patent No.: US 8,751,686 B2
(45) Date of Patent: Jun. 10, 2014

(54) FORWARDING IPV6 PACKETS BASED ON SHORTER ADDRESSES DERIVED FROM THEIR IPV6 DESTINATION ADDRESSES

(75) Inventors: Clarence Filsfils, Brussels (BE); Stefano Benedetto Previdi, Rome (IT); Ian Michael Charles Shand, Cobham (GB); John H. W. Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 13/253,674

(22) Filed: Oct. 5, 2011

(65) Prior Publication Data

US 2013/0089097 A1    Apr. 11, 2013

(51) Int. Cl.
G06F 15/16    (2006.01)

(52) U.S. Cl.
USPC ......................................... 709/245; 370/393

(58) Field of Classification Search
USPC ......................................... 709/245; 370/393
See application file for complete search history.

(56) References Cited

U.S. PATENT DOCUMENTS

| | | | |
|---|---|---|---|
| 6,717,946 B1 | 4/2004 | Hariguchi et al. | |
| 6,804,234 B1 * | 10/2004 | Chow | 370/389 |
| 7,243,161 B1 * | 7/2007 | Tappan et al. | 709/245 |
| 8,510,821 B1 * | 8/2013 | Brandwine et al. | 726/11 |
| 2004/0223502 A1 * | 11/2004 | Wybenga et al. | 370/401 |
| 2004/0233916 A1 * | 11/2004 | Takeuchi et al. | 370/395.54 |
| 2005/0111494 A1 * | 5/2005 | Kecskemeti | 370/521 |
| 2012/0213220 A1 | 8/2012 | Troan et al. | |

OTHER PUBLICATIONS

Carpenter et al., "Transmission of IPv6 over IPv4 Domains without Explicit Tunnels," Mar. 1999, RFC 2529, http://datatracker.ietf.org/doc/rfc2529, The Internet Society, Reston, VA, USA (ten pages).
R. Desprees, "IPv6 Rapid Deployment on IPv4 Infrastructures (6rd)," Jan. 2010, RFC 5569, http://datatracker.ietf.org/doc/rfc5569, The Internet Society, Reston, VA, USA (ten pages).

* cited by examiner

*Primary Examiner* — Kenny Lin
(74) *Attorney, Agent, or Firm* — The Law Office of Kirk D. Williams

(57) ABSTRACT

In one embodiment, a packet switching device is configured to convert an Internet Protocol Version 6 (IPv6) destination address, of a received particular IPv6 packet, to a second, shorter destination address. This second destination address is then used to determine forwarding information for the received IPv6 packet, which is forwarded accordingly. In one embodiment, this second address is a 32-bit address, and in particular, an Internet Protocol Version 4 (IPv4) address. Thus, one embodiment can use the IPv4 forwarding infrastructure of a packet switching device for determining how to forward IPv6 packets. In a network according to one embodiment, packets are encapsulated in an IPv6 packet using an IPv6 destination address (that can be converted to an IPv4 address) of an egress edge packet switching device. Thus, core packet switching devices can forward IPv6 packets using IPv4 lookup operations.

20 Claims, 7 Drawing Sheets

FORWARDING IPV6 PACKETS BASED ON SHORTER ADDRESSES DERIVED FROM THEIR IPV6 DESTINATION ADDRESSES

TECHNICAL FIELD

The present disclosure relates generally to communicating information with a remote device over a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Accordingly, the ability to provide communications mechanisms and methodologies that allow greater bandwidth, achieve superior performance, and/or offer minimal delay presents a significant challenge for designers of packet switching devices and network managers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
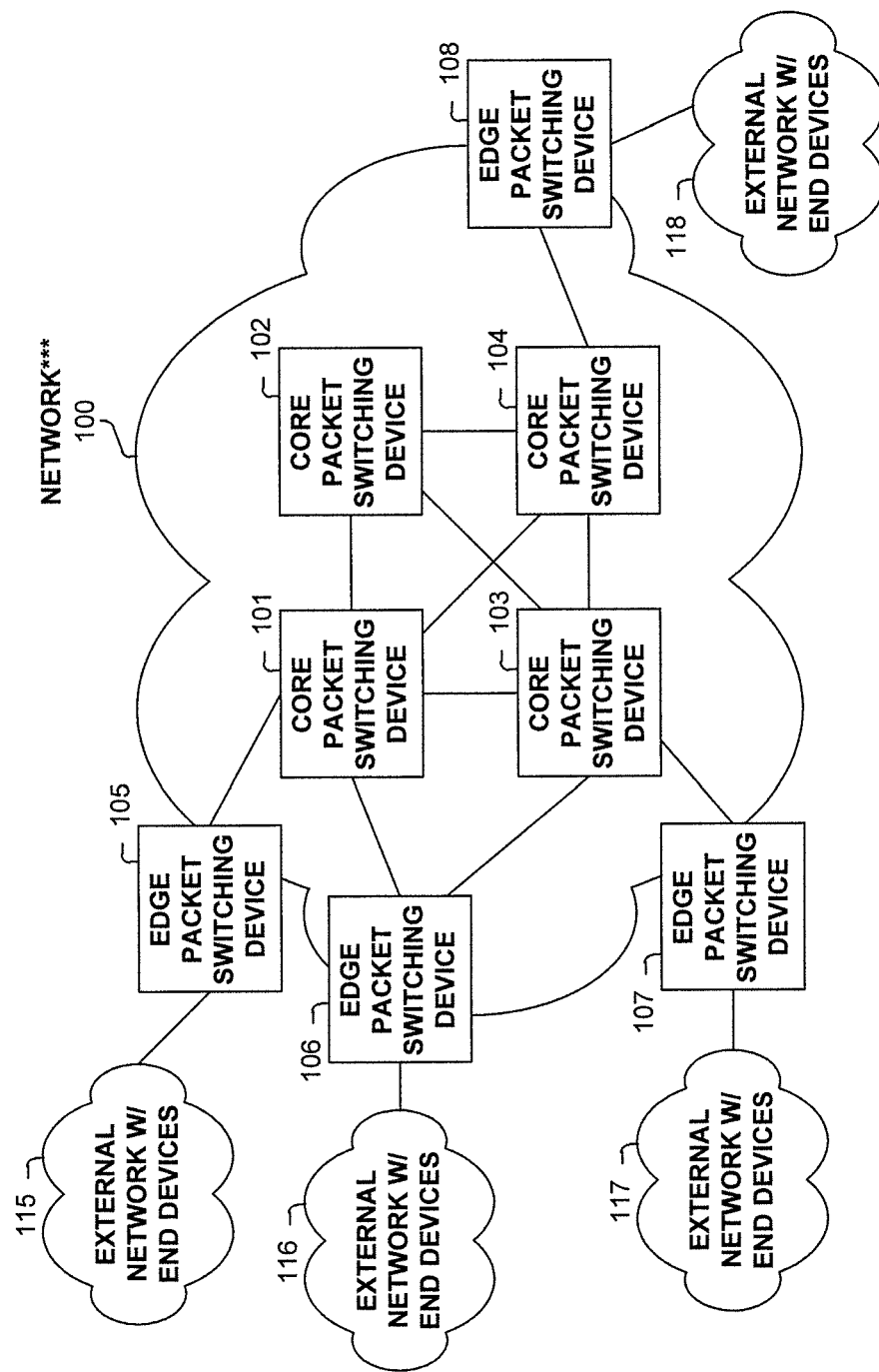
FIG. 1 illustrates a network configured to operate, and/or operating, according to one embodiment.

Disclosed are, inter alia, methods, apparatus, computer-storage media, mechanisms, and means associated with forwarding Internet Protocol Version 6 (IPv6) packets based on shorter addresses (e.g., Internet Protocol Version 4, "IPv4," addresses) derived from their IPv6 destination addresses. One embodiment includes one or more packet switching devices, and/or one or more packet switching devices configured to operate, or actually operating, in a network.

One embodiment includes a particular packet switching device, configured to: maintain IP routing information; convert an IPv6 destination address, of a received particular IPv6 packet, to a second destination address; perform a lookup operation, on the IP routing information, based on the second destination address to determine forwarding information for the received particular IPv6 packet; and to forward the received IPv6 packet from the particular packet switching device according to said determined forwarding information. In one embodiment, the second destination address is a 32-bit address. In one embodiment, the second destination address is a particular Internet Protocol Version 4 (IPv4) address. In one embodiment, the particular packet switching device is configured to: exchange routing information with another packet switching device, with this exchanged routing information including an identification of a particular prefix for adding to IPv4 addresses to produce corresponding IPv6 addresses. In one embodiment, Intermediate System-to-Intermediate System (IS IS) protocol, Open Shortest Path First (OSPF), Interior Gateway Routing Protocol (IGRP), and/or Border Gateway Protocol (BGP) are used to exchange routing information.

One embodiment operates in a network including a core network, including core packet switching devices, and edge packet switching devices. In one embodiment, the core packet switching devices are configured to perform operations, including: maintaining IP routing information for the particular network; receiving a particular Internet Protocol Version 6 (IPv6) packet, including an IPv6 destination address as the destination address of said received particular IPv6 packet; converting the IPv6 destination address to a second destination address; performing a lookup operation, on said IP routing information, based on the second destination address to determine forwarding information for said received particular IPv6 packet; and forwarding said received IPv6 packet from said particular core packet switching device according to said determined forwarding information. In one embodiment, the second destination address is a 32-bit address. In one embodiment, the second destination address is a particular Internet Protocol Version 4 (IPv4) address.

In one embodiment, each of the edge packet switching devices is configured to perform operations, including: performing a lookup operation on a destination address of a received IP packet to determine an IPv6 address of a different edge packet switching device of the plurality of edge packet switching devices; encapsulating the received IP packet in an encapsulating IPv6 packet having an IPv6 destination address of the IPv6 address of the different edge packet switching device; and sending the encapsulating IPv6 packet to a neighboring core router of the plurality of core routers on the way to the different edge packet switching device. In one embodiment, the IPv6 address of the different edge packet switching device is a loopback address of the different edge packet switching device.

In one embodiment, the core and edge packet switching devices are configured to exchange routing information, which includes an identification of a particular prefix for adding to IPv4 addresses to produce corresponding IPv6 addresses; and wherein the IPv6 destination address includes the particular prefix and the particular IPv4 address. In one embodiment, Intermediate System-to-Intermediate System (IS IS) protocol, Open Shortest Path First (OSPF), Interior Gateway Routing Protocol (IGRP), and/or Border Gateway Protocol (BGP) are used to exchange routing information.

2. Description

Disclosed are, inter alia, methods, apparatus, computer-storage media, mechanisms, and means associated with forwarding IPv6 packets based on shorter addresses (e.g., IPv4) derived from their IPv6 destination addresses. One embodiment includes one or more packet switching devices, and/or one or more packet switching devices configured to operate, or actually operating, in a network. In one embodiment, a packet switching device is configured to convert an Internet Protocol Version 6 (IPv6) destination address, of a received particular IPv6 packet, to a second, shorter destination address. This second destination address is then used to determine forwarding information for the received IPv6 packet, which is forwarded accordingly. In one embodiment, this second address is a 32-bit address, and in particular, an Internet Protocol Version 4 (IPv4) address. Thus, one embodiment can use the IPv4 forwarding infrastructure of a packet switching device for determining how to forward IPv6 packets. In a network according to one embodiment, packets are encapsulated in an IPv6 packet using an IPv6 destination address (that can be converted to an IPv4 address) of an egress edge packet switching device. Thus, core packet switching devices can forward IPv4 packets using IPv4 lookup operations.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates a network 100, including one or more or devices 101-108 configured to operate, and/or operating, according to one embodiment. Shown is a typical network configuration of a provider network, with enhancements according to one or more embodiments.

In particular, network 100 includes core packet switching devices 101-104, which operate in the middle or core of network 100. Network 100 also includes edge packet switching devices 105-108, which operate at the edge of network 100 and provide communication connectivity to external networks with end devices (115-118), which typically are customer networks using network 100 to provide network connectivity to other external networks with end devices (115-118).

As edge packet switching devices 105-108 provide routing of packets to exterior networks 115-118, each of edge packet switching devices 105-108 typically needs to be aware of how to route packets to any destination address. To achieve this routing information, each of edge packet switching devices 105-108 and core packet switching devices 101-104 exchange Internet Protocol (IP) routing information in a manner to distribute said IP routing information among the plurality of core packet switching devices 101-104 and the plurality of edge packet switching devices 105-108, such as, but not limited to, communicating Intermediate System-to-Intermediate System (IS-IS), Open Shortest Path First (OSPF), Interior Gateway Routing Protocol (IGRP), and/or Border Gateway Protocol (BGP) routing information packets.

Thus, each of packet switching devices 101-108 have the complete IP routing information for substantially all IP routes. Each of packet switching devices 101-108 typically store this information in a routing information base (RIB), which is a data structure in the control plane of the respective packet switching device 101-108. In one embodiment, core packet switching devices 101-104 do not need all of this forwarding information, as they only need to be configured to forward packets among themselves and to edge packet switching devices 105-108. Thus, in one embodiment, core packet switching devices 101-104 only at least install forwarding information for reaching edge and core packet switching devices 101-108.

In one embodiment, network 100 is an IPv6 network, in that, it forwards IPv6 packets (and possibly others such as IPv4, Multiprotocol Label Switching a.k.a. "MPLS") among edge and core packet switching devices 101-108. In one embodiment, core packet switching devices 101-104 include IPv6 forwarding information in their forwarding information bases (FIBs) used to forward packets. In one embodiment, core packet switching devices 101-104 (and possibly edge packet switching devices 105-108) convert IPv6 destination addresses of packets to IPv4 addresses (or other shorter addresses), and then perform lookup operations on the converted IPv4 destination address to determine forwarding information for the IPv6 packet. In this manner, IPv4 lookup engines and FIBs can be used in forwarding IPv6 packets. Should a FIB not include the forwarding information required, the packet can be "punted" to a route processor for determining how to proceed (which may include referencing the complete routing information maintained by the packet switching device).

Further, in one embodiment, each of edge packet switching devices 105-108 are configured to encapsulate packets received from external networks with end devices 115-118 into IPv6 packets having a destination address of a corresponding egress edge packet switching device 105-108 for each of these packets. Thus in one embodiment, core packet switching devices 105-108 install in their FIBs (e.g., forwarding information used in the data plane) forwarding information for forwarding packets among themselves and to edge packet switching devices 105-108. Further, by using IPv6 destination addresses that can be converted to IPv4 (or other shorter addresses) in these encapsulated packets, core packet switching devices 101-104 can perform this conversion and determine forwarding information for a received IPv6 packet based on this shorter address. Performing lookup operations on shorter destination addresses, in contrast to using full IPv6 addresses, can significantly reduce the resources required to perform these lookup operations. Also, one embodiment further reduces the resources required to perform these lookup operations by changing the destination addresses of most or all of the packets to be transported through network 100 to a destination address (e.g., of a packet encapsulating the originally received packet) of a core packet switching device 101-104 or an edge packet switching device 105-108.

Figure 2:
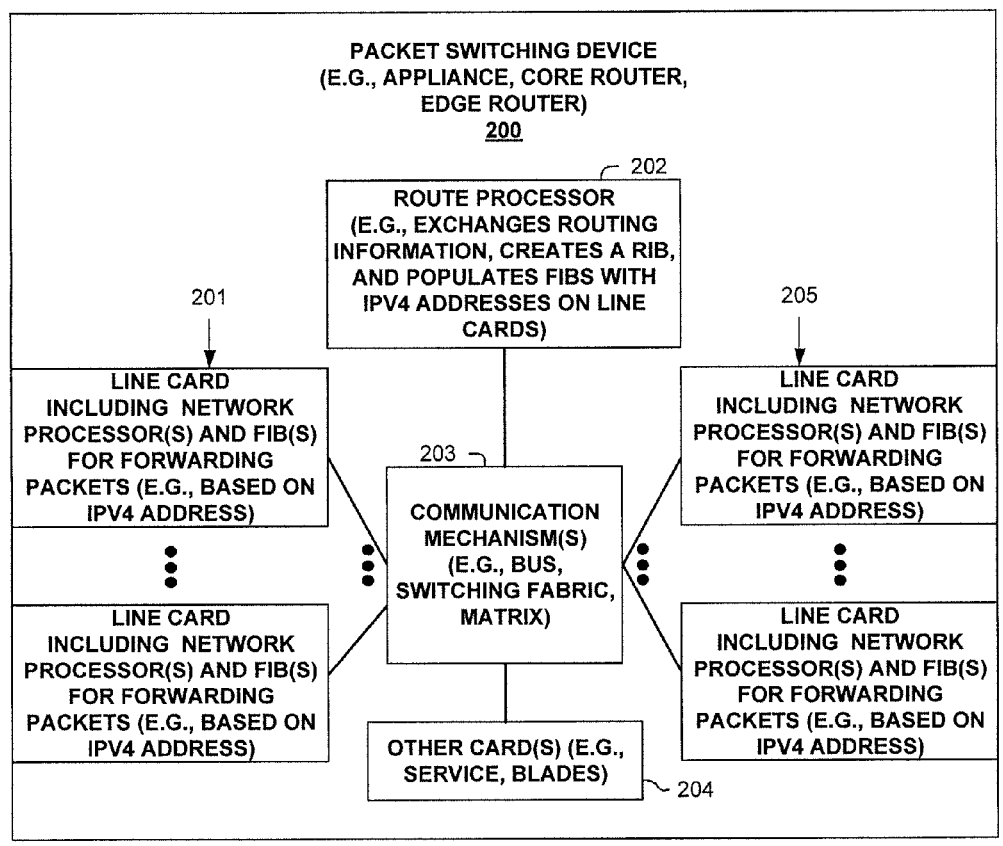
FIG. 2 illustrates a packet switching device configured to operate, and/or operating, according to one embodiment.

One embodiment of packet switching device 200 (e.g., appliance, core router, edge router) is illustrated in FIG. 2. As shown, packet switching device 200 includes line cards 201 and 205, each with one or more FIBs for use in forwarding packets. Additionally, packet switching device 200 also has a route processor 202, which typically manages the control plane by communicating routing information with other packet switching devices, populates one or more RIBs, and populates one or more FIB in line cards 201 and 205 with shorter address (e.g., IPv4) forwarding information for use in forwarding IPv6 packets. Packet switching device 200 also includes other cards 204 (e.g., service cards, blades), and some communication mechanism 203 (e.g., bus, switching fabric, matrix) for allowing its different entities 201, 202, 204 and 205 to communicate.

Figure 3:
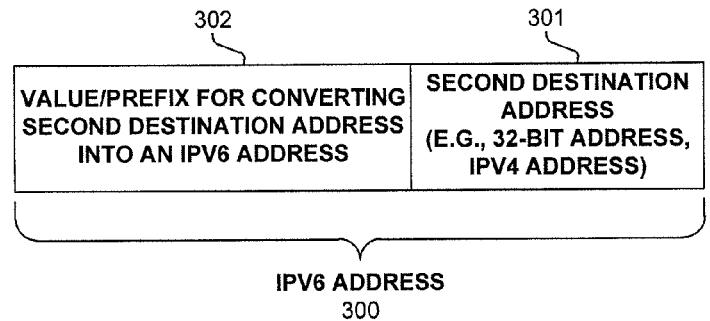
FIG. 3 illustrates one or more addresses used in one embodiment.

FIG. 3 illustrates the structure of an IPv6 address 300 used in one embodiment. In one embodiment, a second destination address 301 (e.g., 32-bit IPv4 address) is converted to IPv6 address 300 by adding a value/prefix 302 to second destination address 301. This process is reversible in that an IPv6 address 300 can be converted to second destination address 301 by removing value/prefix 302 from IPv6 address 300. Thus, in one embodiment, a packet switching device may have an IPv4 destination address (301) assigned to it, and also be referenced by an IPv6 address (302) by using a predetermined value/prefix 302. In one embodiment, a network may use one predetermined value/prefix 302 for all packets, a different predetermined value/prefix 302 for each different customer, or some other allocation scheme.

Figure 4:
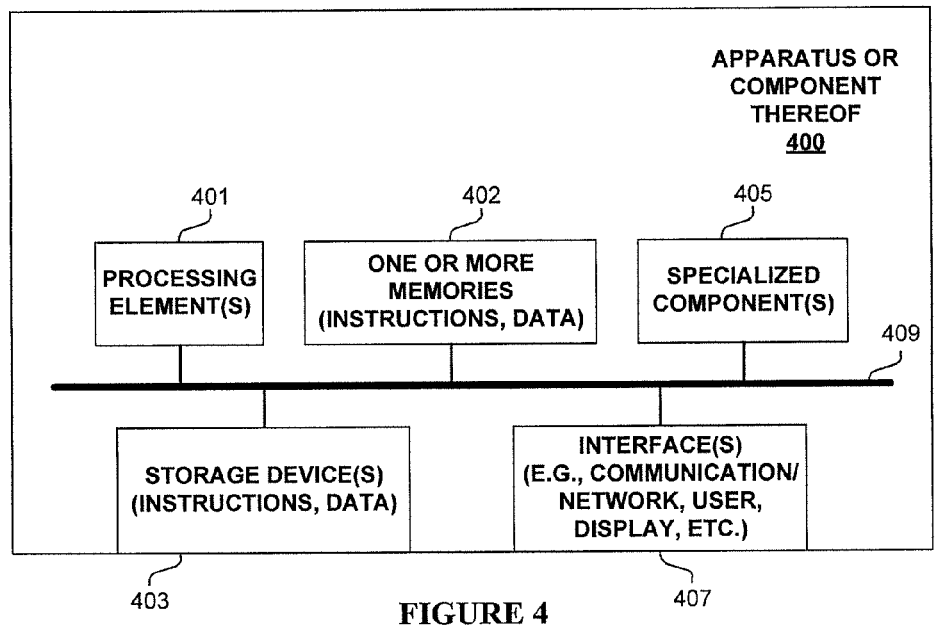
FIG. 4 illustrates an apparatus or component configured to operate, and/or operating, according to one embodiment.

FIG. 4 is a block diagram of an apparatus or component 400 used in one embodiment. One embodiment includes one or more packet switching devices, and/or one or more packet switching devices configured to operate, or actually operating, in a network. In one embodiment, apparatus or component 400 performs one or more processes corresponding to one of the flow diagrams illustrated or otherwise described herein, and/or illustrated in another diagram or otherwise described herein.

In one embodiment, apparatus or component 400 includes one or more processing element(s) 401, memory 402 (e.g., one or more memories), storage device(s) 403, specialized component(s) 405 (e.g. optimized hardware such as for converting addresses, performing operations, etc.), and interface(s) 407 for communicating information (e.g., sending and receiving packets, user-interfaces, displaying information, etc.), which are typically communicatively coupled via one or more communications mechanisms 409, with the communications paths typically tailored to meet the needs of a particular application. In one embodiment, apparatus or component 400 corresponds to, or is part of, a packet switching device 101-108 of FIG. 1.

Various embodiments of apparatus or component 400 may include more or fewer elements. The operation of apparatus or component 400 is typically controlled by processing element(s) 401 using memory 402 and storage device(s) 403 to perform one or more tasks or processes. Memory 402 is one type of computer-readable/computer-storage medium, and typically comprises random access memory (RAM), read only memory (ROM), flash memory, integrated circuits, and/or other memory components. Memory 402 typically stores computer-executable instructions to be executed by processing element(s) 401 and/or data which is manipulated by processing element(s) 401 for implementing functionality in accordance with an embodiment. Storage device(s) 403 are another type of computer-readable medium, and typically comprise solid state storage media, disk drives, diskettes, networked services, tape drives, and other storage devices. Storage device(s) 403 typically store computer-executable instructions to be executed by processing element(s) 401 and/or data which is manipulated by processing element(s) 401 for implementing functionality in accordance with an embodiment.

Figure 5:
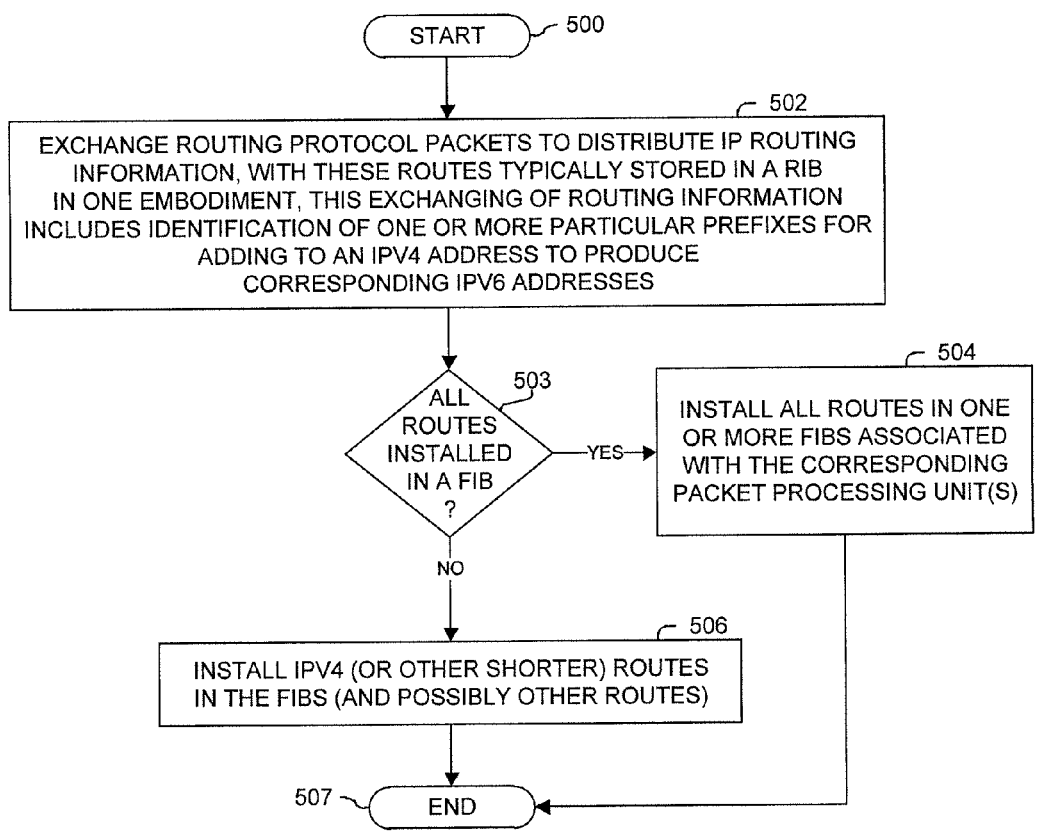
FIG. 5 illustrates a process configured to be performed, and/or performed, in one embodiment.

FIG. 5 illustrates a process configured to be performed and/or performed in one embodiment by a packet switching device. Processing begins with process block 500. In process block 502, routing protocol packets are exchanged with other packet switching devices in the network to distribute IP routing information, with these IP routes typically stored in a RIB.

In one embodiment, this exchanging of routing information includes, but is not limited to, an identification of a prefix/value to be added to an advertised IPv4 address to generate an IPv6 address for referencing the same route, or the identification of a prefix/value to be removed from an advertised IPv6 address to generate an IPv4 address for referencing the same route. In one embodiment, IP routing information is distributed in routing protocol packets using IS-IS, OSPF, IGRP, and/or BGP. One embodiment uses an extension to specify, or otherwise identify, this corresponding value/prefix.

In that context, as determined in process block 503, if all routes are to be installed in one or more FIBs of a packet switching device, then in process block 504, all of the IP routes are installed in one or more FIBs associated with the corresponding packet processing unit(s). Otherwise all routes are not to be installed as determined in process block 503, and then in process block 506, the IPv4 (and/or other shorter address) routes are installed in one or more FIBs (and possibly other routes). Processing of the flow diagram of FIG. 5 is complete as indicated by process block 507.

Figure 6A:
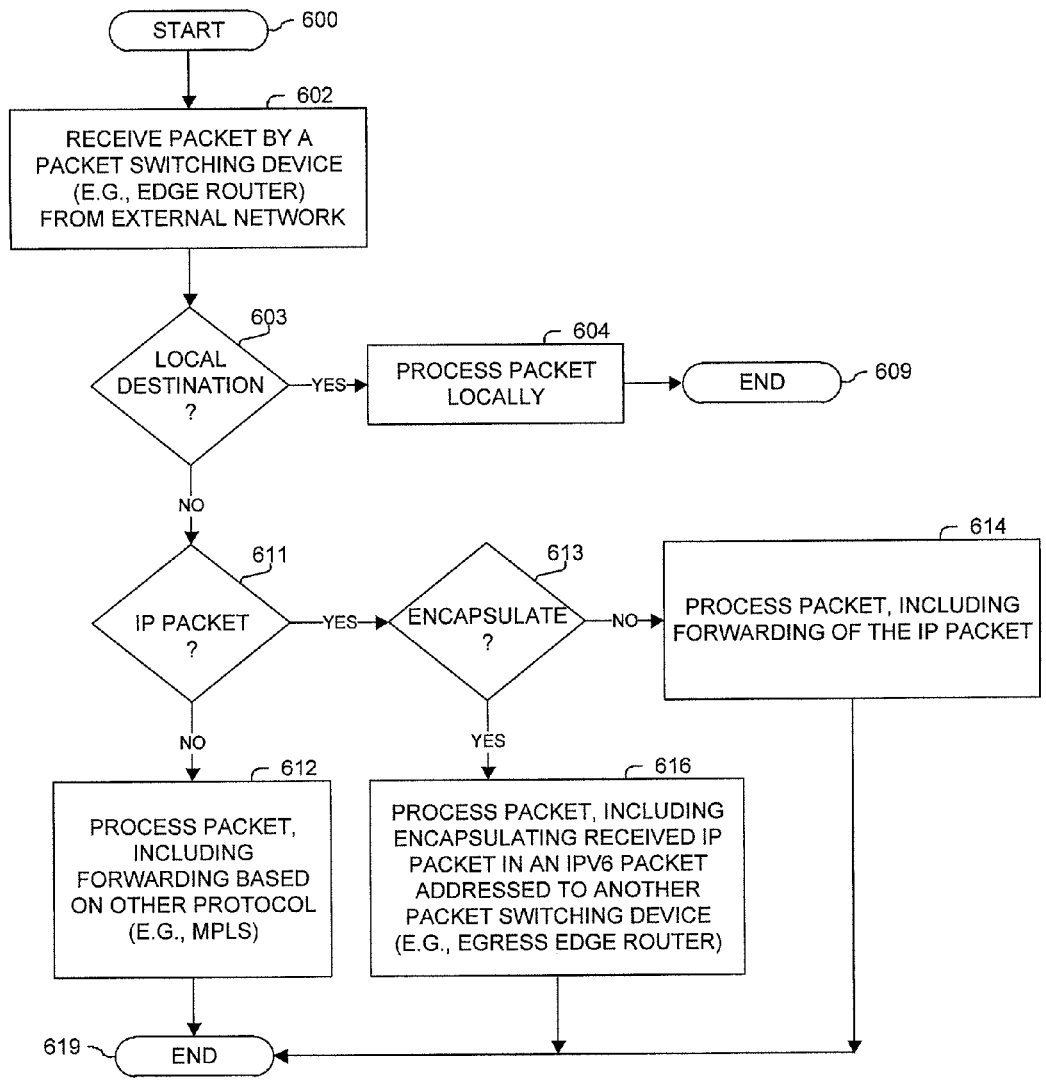
FIG. 6A illustrates a process configured to be performed, and/or performed, in one embodiment.

FIG. 6A illustrates a process configured to be performed and/or performed in one embodiment by a packet switching device, especially an edge packet switching device. Processing begins with process block 600. In process block 602, an IP packet is received by the edge packet switching device from an external network. As determined in process block 603, if the packet is destined for the packet switching device, the packet is processed locally in process block 604, with processing of the flow diagram of FIG. 6A completed as indicated by process block 609.

Otherwise, if it is determined in process block 603 that the packet is not destined for the packet switching device, then as determined in process block 611, if the received packet is not an IP packet, then the packet is processed including forwarding based on the other protocol (e.g., MPLS) in process block 612. Otherwise, if it is determined in process block 611 that the received packet is an IP packet, then as determined in process block 613, if the received packet should not be encapsulated, process flow moves to process block 614, and the received IP packet is processed including forwarding of the IP packet. Otherwise, if it is determined in process block 613 that the received packet is to be encapsulated, then in process block 616, the received IP packet is processed, including encapsulating the received IP packet in an IPv6 packet having an IPv6 destination address (typically that can be converted to an IPv4 or other shorter address) of another packet switching device within the network (e.g., an edge packet switching device from which the received IP packet will be sent from the network). Processing of the flow diagram of FIG. 6A is complete as indicated by process block 619.

Figure 6B:
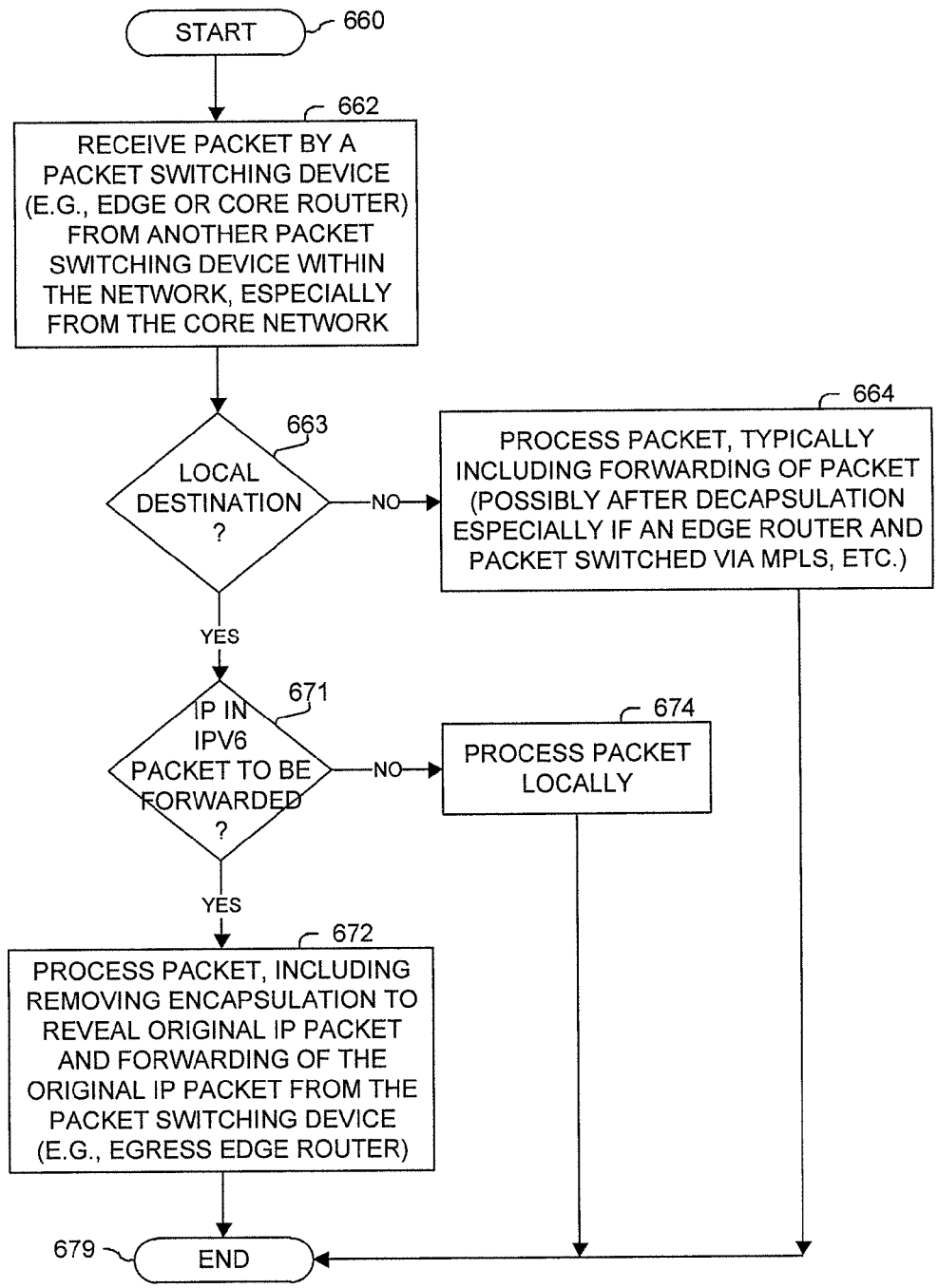
FIG. 6B illustrates a process configured to be performed, and/or performed, in one embodiment.

FIG. 6B illustrates a process configured to be performed and/or performed in one embodiment by a networked packet switching device. Processing begins with process block 660. In process block 662, a packet is received by a packet switching device from another packet switching device within the network, such as, but not limited to, an edge or core packet switching device receiving the packet from an edge or core packet switching device. As determined in process block 663, if the packet is not addressed for the packet switching device (i.e., the packet switching device that received the packet), then the packet is processed in process block 664, which typically includes forwarding of the received packet or a decapsulated packet within the received packet. For example in one embodiment, if a MPLS packet is received by an edge packet switching device, the edge packet switching device will typically remove the MPLS encapsulation and forward the revealed packet. For example in one embodiment, if a core packet switching device receives a packet, it will typically forward the received packet (possibly after removing or updating a label if it is a MPLS packet).

Otherwise, the packet is addressed to the receiving packet switching device as determined in process block 663. Next, as determined in process block 671, if the received packet is an IP in IPv6 packet with the encapsulated IP packet to be forwarded (e.g., as identified by a protocol type of IP in IP), then, in process block 672, the received IPv6 packet is processed, including removing the IPv6 encapsulation such as to expose the encapsulated IP packet, which is then forwarded from the packet switching device.

In one embodiment, this revealed encapsulated IP packet is an IP packet originally received and encapsulated by another edge packet switching device in the network (e.g., as described in relation to process block 616 of FIG. 6A). In one embodiment, an edge packet switching device is performing the operations described in FIG. 6B. Thus, one embodiment significantly reduces the number of IP addresses required for forwarding packets through the network by encapsulating received IP packets in an IP packet having an address of another packet switching device in the network. Thus in one embodiment, packet switching devices within the core of the network switch IP packets based substantially only on IP addresses of packet switching devices (e.g., core and edge) within the network. This greatly reduces the number of routes that need to be installed in a forwarding information base (FIB) of a core router of one embodiment.

Otherwise, as determined in process block 671, the packet is actually destined for the receiving packet switching device (e.g., a routing update packet for the packet switching device), and the packet is processed locally in process block 674.

Processing of the flow diagram of FIG. 6B is complete as indicated by process block 679.

Figure 7:
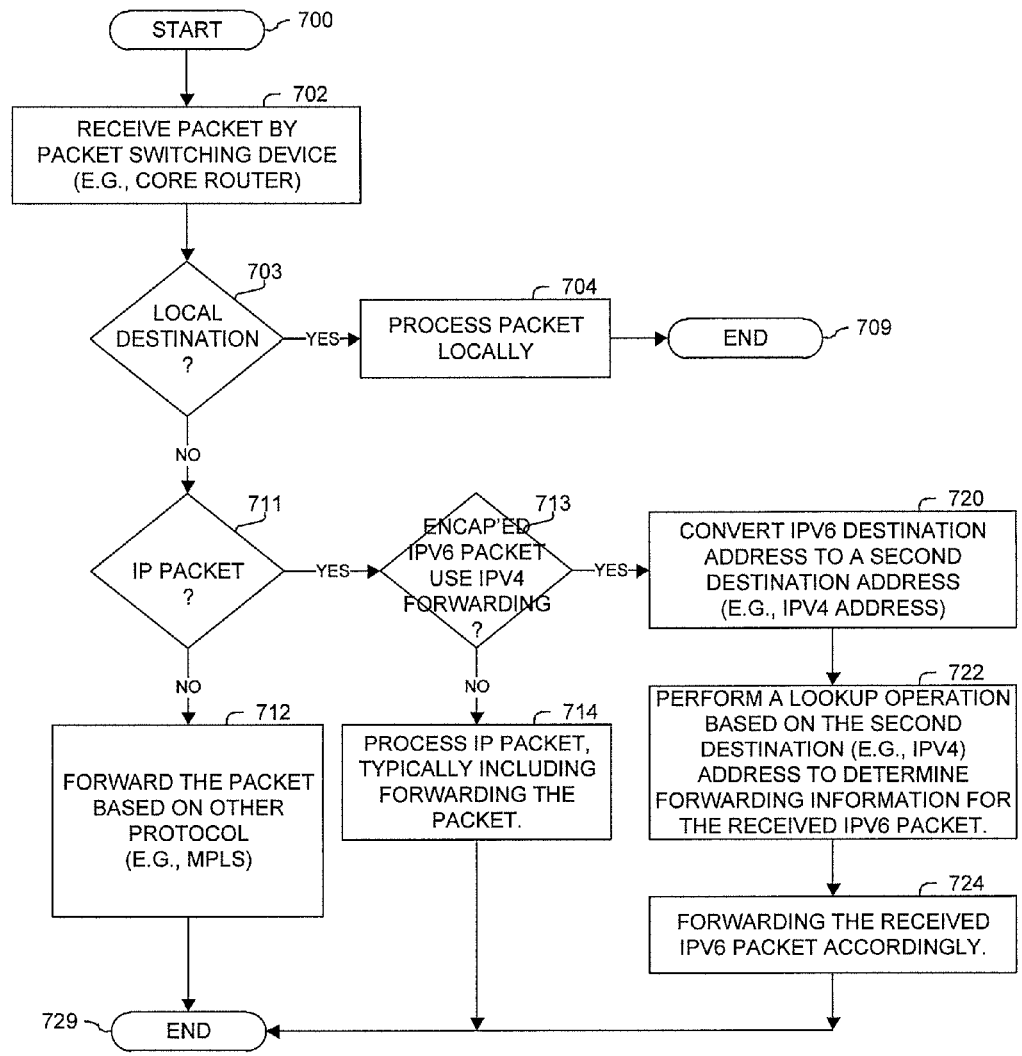
FIG. 7 illustrates a process configured to be performed, and/or performed, in one embodiment.

FIG. 7 illustrates a process configured to be performed and/or performed in one embodiment by a packet switching device, especially a core packet switching device. Processing begins with process block 700. In process block 702, an IP packet is received by the core packet switching device from another packet switching device (e.g., core or edge router) in the network. As determined in process block 703, if the packet is destined for the packet switching device, the packet is processed locally in process block 704, with processing of the flow diagram of FIG. 7 is complete as indicated by process block 709.

Otherwise, if it was determined in process block 703 that the packet is not destined for the packet switching device, then as determined in process block 711, if the received packet is not an IP packet, then the packet is processed including forwarding based on the other protocol (e.g., MPLS) in process block 712.

Otherwise, in process block 711 the received packet was determined to be an IP packet, and then as determined in process block 713, if the received packet is not an IPv6 packet encapsulated using an IPv6 destination address to be converted to an IPv4 destination address, then in process block 714, the received IP packet is processed, including performing a longest prefix matching operation in a longest prefix matching FIB based on the destination address of the received IP packet.

Otherwise it was determined in process block 713 that the received packet is an IPv6 packet encapsulated using an IPv6 destination address to be converted to an IPv4 destination address, and processing proceeds to process block 720. The IPv6 destination address is converted to a second address (e.g., IPv4 address, 32-bit address, or other shorter address). In process block 722, a lookup operation is performed based on the second destination address to determine how to forward the packet; and in process block 724, the received IPv6 packet is forwarded according to the forwarding information determined based on the converted to second address. Thus in one embodiment, packet switching devices within the core of the network switch IPv6 packets using lookup operations on shorter addresses (e.g., IPv4), which may allow these packet switching devices to use fewer resources (e.g., conventional and/or associative memory, lookup engine cycles, etc.) than that required if lookup operations were performed on the entire IPv6 address. Further, if an IPv6 is converted to an IPv4 address, the same lookup operation could be performed for an IPv4 packet received with the same IPv4 address, which may further reduce the requirements of forwarding resources in one embodiment.

Processing of the flow diagram of FIG. 7 is complete as indicated by process block 729.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be altered and/or re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A particular packet switching device, comprising:
one or more processing elements;
memory;
a plurality of interfaces configured to send and receive packets; and
one or more packet switching mechanisms configured to packet switch packets among said interfaces;
wherein said one or more processing elements are configured to perform operations, including:
maintaining said IP routing information;
converting an Internet Protocol Version 6 (IPv6) destination address, of a received particular IPv6 packet, to a second destination address;
performing a lookup operation, on said IP routing information, based on the second destination address to determine forwarding information for said received particular IPv6 packet; and
forwarding said received particular IPv6 packet from the particular packet switching device according to said determined forwarding information.

2. The particular packet switching device of claim 1, wherein the second destination address is a particular Internet Protocol Version 4 (IPv4) address.

3. The particular packet switching device of claim 2, wherein said operations include: exchanging routing information with another packet switching device in a particular network including the particular packet switching device; wherein said exchanged routing information includes an identification of a particular prefix for adding to IPv4 addresses to produce corresponding IPv6 addresses; and wherein the IPv6 destination address includes the particular prefix and the particular IPv4 address.

4. The particular packet switching device of claim 3, wherein said exchanging routing information includes using one or more of Intermediate System-to-Intermediate System (IS-IS) protocol, Open Shortest Path First (OSPF), Interior Gateway Routing Protocol (IGRP), and Border Gateway Protocol (BGP).

5. The particular packet switching device of claim 2, wherein said operations include:
performing a lookup operation, on said IP routing information, based on the IPv4 address of a received particular IPv4 packet with the IPv4 address being the second destination address, to determine forwarding information for said received particular IPv4 packet; and
forwarding said received IPv4 packet from the particular packet switching device according to said determined forwarding information.

6. The particular packet switching device of claim 1, wherein the second destination address is a 32-bit address.

7. A method, comprising:
performing operations by a particular packet switching device, with said operations comprising:
maintaining IP routing information for a particular network, including the particular packet switching device;
receiving a particular Internet Protocol Version 6 (IPv6) packet, including an IPv6 destination address as the destination address of said received particular IPv6 packet;
converting the IPv6 destination address to a second destination address;
performing a lookup operation, on said IP routing information, based on the second destination address to determine forwarding information for said received particular IPv6 packet; and
forwarding said received particular IPv6 packet from the particular packet switching device according to said determined forwarding information.

8. The method of claim 7, wherein the second destination address is a particular Internet Protocol Version 4 (IPv4) address.

9. The method of claim 8, wherein said operations include exchanging routing information with another packet switching device in the particular network; wherein said exchanged routing information includes an identification of a particular prefix for adding to IPv4 addresses to produce corresponding IPv6 addresses; and wherein the IPv6 destination address includes the particular prefix and the particular IPv4 address.

10. The method of claim 9, wherein said exchanging routing information includes using one or more of Intermediate System-to-Intermediate System (IS-IS) protocol, Open Shortest Path First (OSPF), Interior Gateway Routing Protocol (IGRP), and Border Gateway Protocol (BGP).

11. The method of claim 9, wherein said operations comprise: in response to determining that the IPv6 destination address of said received particular IPv6 packet includes the particular prefix, performing said operation of converting the IPv6 destination address to the second destination address.

12. The method of claim 8, wherein said operations include:
performing a lookup operation, on said IP routing information, based on the IPv4 address of a received particular IPv4 packet with the IPv4 address being the second destination address, to determine forwarding information for said received particular IPv4 packet; and
forwarding said received IPv4 packet from the particular packet switching device according to said determined forwarding information.

13. The method of claim 7, wherein the second destination address is a 32-bit address.

14. A particular network, comprising:
a core network, including a plurality of core packet switching devices, with each of the plurality of core packet switching devices configured to perform operations; and
a plurality of edge packet switching devices, with each of the plurality of edge packet switching devices configured to perform operations, including communicating packets with the core network, and with one or more external networks or devices;
wherein said configuration of each particular core packet switching device of the plurality of core packet switching devices includes:
maintaining IP routing information for the particular network;
receiving a particular Internet Protocol Version 6 (IPv6) packet, including an IPv6 destination address as the destination address of said received particular IPv6 packet;
converting the IPv6 destination address to a second destination address;

performing a lookup operation, on said IP routing information, based on the second destination address to determine forwarding information for said received particular IPv6 packet; and forwarding said received IPv6 packet from said particular core packet switching device according to said determined forwarding information.

15. The particular network of claim 14, wherein the second destination address is a particular Internet Protocol Version 4 (IPv4) address.

16. The particular network of claim 15, wherein said configuration of the each of the plurality of edge packet switching devices includes:

performing a lookup operation on a destination address of a received IP packet to determine an IPv6 address of a different edge packet switching device of the plurality of edge packet switching devices;

encapsulating the received IP packet in an encapsulating IPv6 packet having an IPv6 destination address of the IPv6 address of the different edge packet switching device; and sending the encapsulating IPv6 packet to a neighboring core router of the plurality of core routers on the way to the different edge packet switching device.

17. The particular network of claim 16, wherein the IPv6 address of the different edge packet switching device is a loopback address of the different edge packet switching device.

18. The particular network of claim 16, wherein said configuration on the plurality of core packet switching devices and the plurality of edge packet switching devices includes: exchanging routing information, which includes an identification of a particular prefix for adding to IPv4 addresses to produce corresponding IPv6 addresses; and wherein the IPv6 destination address includes the particular prefix and the particular IPv4 address.

19. The network of claim 14, wherein said exchanging routing information includes using one or more of Intermediate System-to-Intermediate System (IS-IS) protocol, Open Shortest Path First (OSPF), Interior Gateway Routing Protocol (IGRP), and Border Gateway Protocol (BGP).

20. The network of claim 14, wherein said configuration of the each of the plurality of edge packet switching devices includes:

performing a lookup operation on a destination address of a received IP packet to determine an IPv6 address of a different edge packet switching device of the plurality of edge packet switching devices;

encapsulating the received IP packet in an encapsulating IPv6 packet having an IPv6 destination address of the IPv6 address of the different edge packet switching device; and sending the encapsulating IPv6 packet to a neighboring core router of the plurality of core routers on the way to the different edge packet switching device.

* * * * *